Feb. 13, 1940. H. H. DILLON 2,190,207
PISTON
Filed March 10, 1937
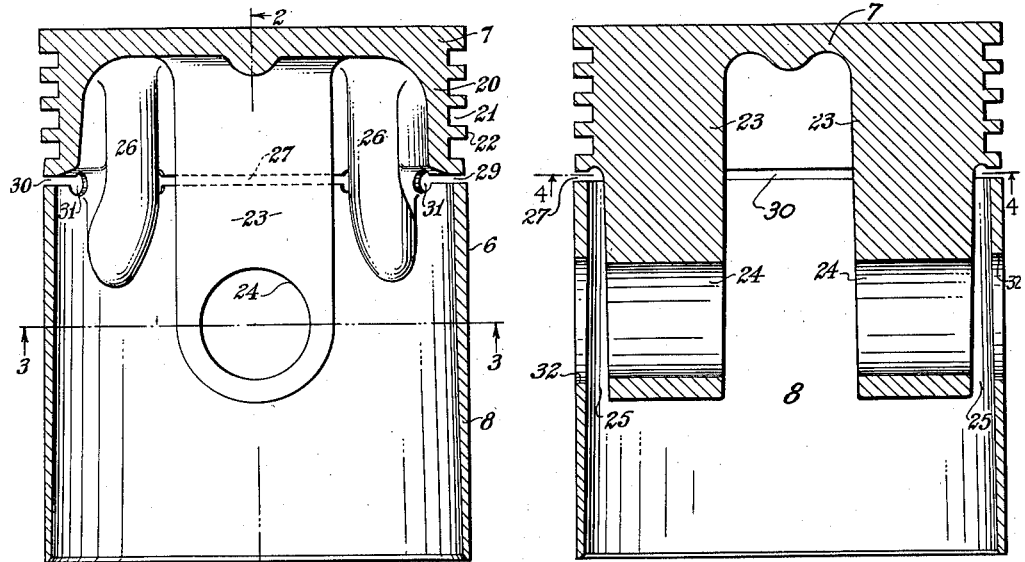
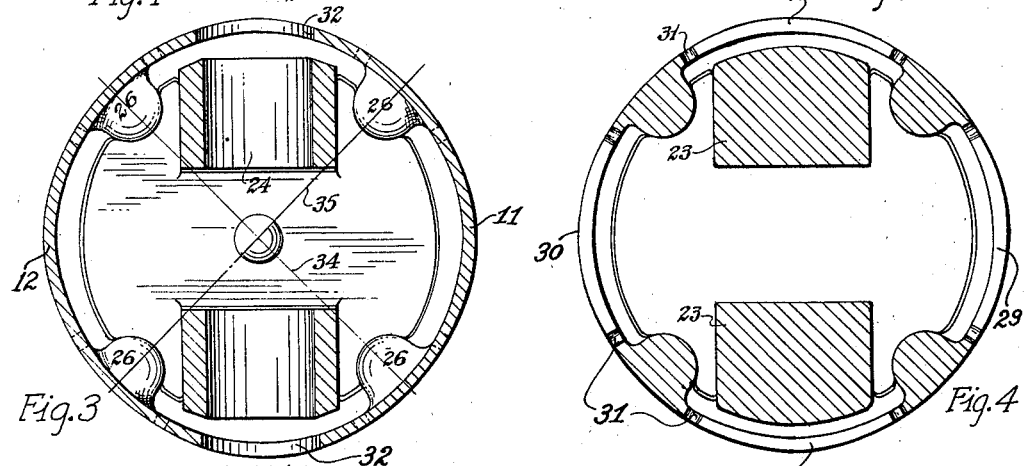
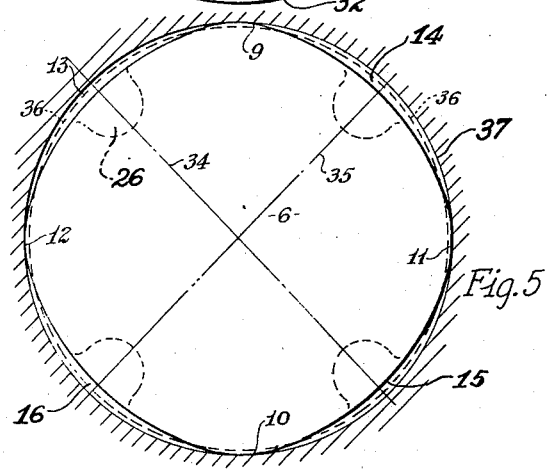
INVENTOR.
HAROLD H. DILLON.
BY
ATTORNEY.

Patented Feb. 13, 1940

2,190,207

UNITED STATES PATENT OFFICE 2,190,207

PISTON

Harold H. Dillon, Cleveland, Ohio, assignor, by mesne assignments, to The Cleveland Trust Company, Cleveland, Ohio, a corporation of Ohio, as trustee Application March 10, 1937, Serial No. 130,086

5 Claims. (Cl. 309—11)

This invention relates to pistons for internal combustion engines and the like, and particularly to pistons composed of aluminum alloy or other metal alloy having a higher coefficient of thermal expansion than the material of the cylinder in which the piston is to operate.

Recent developments in light metal pistons have been directed toward the production of a light metal piston in which the head and skirt are constructed and arranged with respect to each other so as to utilize the thermal expansion of the head to reform or change the shape of the skirt. Among the most successful pistons of this type are those in which the head and skirt are substantially integral with each other in the region of the pin bosses and separated from each other at each side of the wrist pin boss region. Theoretically this type of piston employs the thermal expansion in the head to move the wrist pin bosses away from each other and flex the thrust faces so as to tend to reduce the diameter across the thrust faces. To enable the wrist pin bosses to move away from each other along the wrist pin axis necessitates a clearance between the piston and the cylinder wall along this axis proportional to the amount of movement along the axis. The present invention relates to improvements in a light metal piston wherein the thermal expansion of the head is utilized to change the shape of the skirt and in which the piston is closely fitted to the wall of the cylinder along the wrist pin axis so as to obtain operating advantages unobtainable in pistons having their least diameter on the wrist pin axis.

The principal object of this invention is to provide a relatively simple and inexpensive piston construction which may be fitted when cold to a cylinder with a sufficiently small clearance to avoid piston slap and to minimize oil consumption and which will flex to permit thermal expansion without binding in the cylinder while at the same time being arranged to provide ample bearing surfaces for transmitting the thrust loads to the cylinder walls without high localized pressures, excessive friction, or premature fatigue failure.

It is among the objects of my invention to provide a piston having opposed thrust faces and opposed bearing faces normal to the thrust faces arranged to present efficient bearing surfaces to the walls of the cylinder throughout the range of temperatures to which the piston is subjected during its operation. It is a further object of my invention to provide a piston wherein the skirt portion is flexibly constructed and so arranged with respect to the head that the thrust faces thereof and the pin boss faces thereof are maintained in load bearing relation with the walls of the cylinder throughout the temperature range of operation. It is a further object of my invention to provide a piston according to the preceding object wherein the skirt portion is flexed during operation to prevent high bearing pressures at either the thrust faces or the pin boss faces. It is a further object of my invention to provide a piston wherein the skirt portion is closely fitted in the cylinder across the pin boss axis thereof so as to prevent slap of the piston when cold and in which the shape of the skirt portion is varied by the expansion in the head of the piston to prevent excessively high bearing pressures on said pin boss faces when the piston is hot. A further object of my invention is to provide a piston according to the preceding objects which is free of reentrant curves on the interior thereof and thus adapted for casting in permanent molds. Further objects and advantages relating to economies of manufacture and use will appear from the following description and the appended drawing wherein:

Figure 1 is a vertical sectional view taken substantially across the thrust face axis of a piston constructed according to my invention;

Figure 2 is a vertical sectional view taken on the plane substantially at right angles to the section of Figure 1;

Figure 3 is a sectional view taken along the line 3—3 of Figure 1;

Figure 4 is a sectional view taken along the line 4—4 of Figure 2;

Figure 5 is an exaggerated diagrammatic showing of a piston constructed according to my invention.

Referring to the drawing the piston which in its entirety is indicated at 6 in Figure 1 comprises an integrally cast head 7 and skirt 8 in which the head has a circular cross sectional contour and is proportioned with respect to the cylinder within which it operates so that the head will not bear against the walls of the cylinder when heated during operation. The skirt portion 8 is characterized generally by a "four faced contour" (indicated diagrammatically at Figure 5) in that it is provided with four spaced bearing faces 9—10—11—12 which are separated from each other by relieved portions 13—14—15—16.

The head 7 of the piston is provided with the usual depending ring flange 20 having annular ring grooves 21 therein spaced from each other by ring lands 22. To operatively connect the piston to a connecting rod, opposed wrist pin bosses 23 are arranged to depend from the head 7 and extend downwardly into the interior of the piston skirt where they are apertured as at 24 to provide wrist pin bearings. As will be observed in Figure 2 the bosses are separated from the skirt walls as at 25. The skirt 8 also depends from the head and is secured thereto through the spaced ribs 26 whereby loads are transmitted between the skirt and the connecting rod through the medium of ribs 26, the head and depending bosses 23.

The skirt portion 8 of the piston is secured to and preferably is cast integral with the head by four spaced ribs or hangers 26 which are arranged substantially 90° from each other and substantially 45° from the wrist pin axis and the thrust face axis. Preferably the skirt portion 8 of the piston is separated from the ring flange 20 above each of the thrust faces 9—10—11—12 by horizontal slots 27—28—29—30 so that the depending ribs or hangers 26 constitute the sole connection between the skirt and the rest of the piston including the head and pin bosses. Each of the horizontal slots 27—30 terminates in drilled apertures 31 located partially within the hangers 26. The piston skirt is apertured as at 32 in alignment with the wrist pin apertures 24 to permit the insertion and removal of the wrist pin. The diameter of the apertures 32 exceeds the diameter of the apertures 24 so that no loads may be transmitted directly from the wrist pin to the skirt and the wrist pin is preferably proportioned so that when properly positioned it will not extend within the apertures 32 of the skirt.

Preferably the thrust faces 11 and 12 are provided with an oval contour having the major axis of the oval extending normal to the axis of the wrist pin bosses and the wrist pin boss faces are provided with an oval contour having the major axis thereof coincident with the wrist pin boss axis. This construction results in four spaced cylinder bearing walls having a constantly increasing deviation from the circular wall of the cylinder within which the piston operates. The oval walls merge at a point substantially 45° from the wrist pin axis and the point of merger is coincident with the ribs or hangers 26 arranged to secure the skirt to the head. The piston is preferably formed at the juncture between the thrust faces and the wrist pin faces to provide relieved areas 13—14—15—16. The above described ovality of the skirt portions and relieved portions may be obtained by a cam grinding of the piston and although the deviation from the circular walls of the cylinder within which the piston operates is relatively slight and measured in thousandths of an inch I have indicated the preferred curvatures or shape exaggerated and diagrammatically in Figure 5 wherein the four-faced piston 6 is arranged within a circular cylinder 37.

As a specific example of an operative piston constructed according to my invention I have found that such a piston for an automobile engine cylinder of $3\frac{7}{16}$" bore functions satisfactorily where the piston has a diameter across the thrust faces and across the pin boss axis of about 3.436 inches, thus providing about .001" between the piston and cylinder wall. The relieved areas in a piston of this size were shaped to provide a diameter thereacross about .009" less than the diameter across the thrust faces or across the pin boss axis. This results in a clearance of about .005" between the piston and the cylinder wall in each of the relieved areas indicated at 13—14—15—16. The head diameter in the piston just described may vary from 3.417" at the top of the piston to about 3.424" at the lower edge of the ring flange. During the operation of a piston as above described the thermal expansion was insufficient to bring the head into cylinder wall bearing contact and the skirt operated in a manner which relieved the bearing portions of any localized high bearing pressures. It will be appreciated that there may be considerable variation in proportion from the specific example outlined by way of illustration due to the use of various light metal alloys, differences in the heat and load characteristics of the engine and other variable factors. This exaggerated showing of the oval bearing faces 9, 10, 11 and 12 and relieved portions 13—14—15 and 16 is made to emphasize the mechanical effect of the expansion in the piston head upon the piston skirt.

The head of the piston being the hottest part of the piston the thermal expansion in this section is the most marked and as the thermal expansion takes place in the head the ribs or hangers 26 carried thereby are moved outwardly away from each other along the axes 34 and 35. The thrust faces and the pin boss bearing faces being separated from the head of the skirt by horizontal slots 27 to 30 inclusive and being free of restraint by any struts or the like on the pin bosses, may flex independently. The movement of the ribs or hangers 26 outwardly from each other along the axes 34 and 35 tends to change the shape of the thrust faces by moving the areas 13, 14, 15 and 16 outwardly toward the cylinder walls and thus decreases the deviation of the thrust face from the circular wall of the cylinder within which the piston operates. The same movement of the ribs or hangers outwardly also changes the shape of the skirt bearing portions 9 and 10 which are in alignment with the wrist pin axis. The effect of the expansion in the head upon the skirt is graphically illustrated by the dotted line 36 in Figure 5, wherein the curved faces are flexed and the skirt approaches a circular contour in cross section.

From the foregoing it will be appreciated that in a piston according to my invention the differential in the expansion of head and skirt occasioned by the temperature differential is utilized to mechanically change the contour of the skirt. The amount of change in shape occasioned by expansion in the skirt and the amount or effect upon the skirt by the expansion in the head will depend upon numerous variable factors such as the heat of operation, the thinness or flexibility of the skirt and the particular light metal alloy employed. It appears, however, that in most instances the mechanical deformation of the skirt occasioned by movement along the axes 34 and 35 is accompanied by heat and expansion in the skirt per se and that the thermal expansion effects in head and skirt combine with the flexing of the skirt to cylinder bearing pressure to increase the area of the cylinder bearing surface of the faces 9, 10, 11 and 12.

I believe that the above described change in shape of the bearing faces of the skirt portion of the piston continues throughout the changes in temperature of the piston occasioned by its operation in the engine and that as higher speeds and higher temperatures in the head develop more skirt wall area is brought into load bearing contact with the cylinder walls. It will be observed that the bearing surfaces 9 to 12 inclusive tend to be pulled away from the cylinder wall by the deformation so as to effect a uniform distribution of the bearing loads at all temperatures and insure against localized high bearing pressures.

When the piston is cold it will be observed that the skirt portions 9 and 10 have their maximum curvature and effectively prevent any slapping of the piston which might be occasioned by movement of the same along the wrist pin. The minimum and maximum thrust faces of the piston 11 and 12 likewise tend to have their maximum curvature when the piston is cold and effectively prevent any cocking or tilting of the piston during the initiation of its operation. It will be understood that the heat flow from the head of the piston downwardly through the ribs or hangers 26 will be dissipated through the walls of the skirt 8 and thence through the walls of the surrounding cylinder and that this heat flow may modify the mechanical action of the piston head upon the piston skirt. The expansion in the skirt, however, will tend to increase the circumference thereof and this circumferential increase plus the change in shape brings the heated piston skirt into substantial conformance with the circular cylinder walls.

As will be understood by those skilled in the art the oval faces and the relieved portions in the skirt walls where the oval faces merge need not be continued to the open end of the skirt in all instances and where the operative characteristics of the engine are such that the open end of the skirt is relatively cool, the deviation from a circular contour in the piston may terminate above the open end of the skirt.

Although I have shown and described one form of my invention with considerable detail, it will be understood that I do not wish to be limited to the specific disclosure, since numerous colorable variations may be made therein and that I should rather be limited by the structure defined in the following claims and the equivalents thereof to which I am entitled in this art.

I claim:

1. A piston comprising an integrally formed head and skirt, said head provided with a depending ring flange and a pair of depending apertured pin bosses, said bosses extending downwardly within the skirt portion of the piston and spaced from the walls thereof, said skirt provided with opposed bearing faces having apertures in alignment with said depending pin boss apertures, and a pair of opposed thrust faces on an axis normal to the axis of said pin boss apertures, the central portion of each of said bearing faces and said thrust faces being separated from said ring flange by a horizontal slot and the end portions of each of said bearing faces and said thrust faces joined to each other and to said ring flange by an integrally formed connector.

2. A light metal alloy piston comprising an integrally cast head and skirt, said head provided with a pair of depending apertured wrist pin bosses separated from each other and free of said skirt, said skirt portion provided with a pair of opposed thrust faces arranged on an axis normal to the wrist pin axis, said skirt provided with a pair of opposed load bearing surfaces arranged on an axis coincident with said wrist pin boss axis, said thrust faces and said load bearing faces merging with each other and secured by means of a depending hanger to said piston head at a point substantially 45° from the wrist pin axis.

3. A light metal piston comprising an integrally cast head and skirt, said head provided with a depending ring flange and a pair of opposed apertured depending wrist pin bosses, said skirt portion having a pair of opposed thrust faces provided with an oval cross sectional contour with the major axis thereof normal to the wrist pin axis and a pair of opposed load bearing faces having an oval contour with its major axis coincident with the wrist pin axis, each of said thrust faces and said load bearing faces being separated from said piston head by a horizontal slot at its upper edge, the ends of said load bearing faces and said thrust faces joined to each other and to said head by hangers depending from said head.

4. A light metal piston comprising an integrally cast head and skirt, said head provided with a depending ring flange and a pair of opposed apertured depending wrist pin bosses, said skirt portion having a pair of opposed thrust faces provided with an oval contour with the major axis thereof normal to the wrist pin axis and a pair of opposed load bearing faces having an oval cross sectional contour with the major axis coincident with the wrist pin axis, each of said thrust faces and said load bearing faces being separated from said piston head by a horizontal slot at its upper edge, the ends of said load bearing faces and said thrust faces joined to each other and to said head by hangers depending from said head, said hangers arranged on axes spaced substantially 45° from said wrist pin axis whereby thermal expansion in said head moves said hangers away from each other and effects a deformation of said load bearing faces and said thrust faces.

5. In an internal combustion engine, a cylinder circular in cross section, a piston arranged to reciprocate within the cylinder composed of a material having a higher co-efficient of expansion than the material of the cylinder, said piston comprising an integrally cast head and skirt, said skirt provided with a pair of opposed wrist pin apertures and being separated from the head above said apertures by horizontal slots, said skirt having thrust faces between said wrist pin apertures and being separated from the head above said thrust faces on an axis normal to said wrist pin aperture axis, said skirt being shaped to have a close bearing relation with the circular cylinder at the ends of the axis of said wrist pin apertures and at the ends of the axis normal thereto, and to be relieved from the wall of said cylinder therebetween, the bearing relation between the cylinder and said thrust faces at the ends of the axis normal to the wrist pin aperture axis being sufficiently close and of sufficient longitudinal extent when the piston is cold to prevent cocking or tilting of the piston within the cylinder, and said skirt being connected to said head at four points between the ends of said horizontal slots whereby the excess expansion of the head when the piston is heated up operates to deform the piston skirt.

HAROLD H. DILLON.